United States Patent
Mustapha

(10) Patent No.: US 9,848,367 B2
(45) Date of Patent: *Dec. 19, 2017

(54) ENHANCED DEDICATED-CHANNEL REPORTING FOR UMTS

(71) Applicant: NEC CORPORATION, Tokyo (JP)

(72) Inventor: Mazlyn Mona Mustapha, Surrey (GB)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,862

(22) Filed: May 24, 2016

(65) Prior Publication Data
US 2016/0269959 A1 Sep. 15, 2016

Related U.S. Application Data

(63) Continuation of application No. 14/801,886, filed on Jul. 17, 2015, now Pat. No. 9,374,758, which is a (Continued)

(30) Foreign Application Priority Data
Oct. 31, 2005 (GB) .................................. 0522185.8

(51) Int. Cl.
H04W 36/30 (2009.01)
H04W 36/00 (2009.01)
(Continued)

(52) U.S. Cl.
CPC ........... *H04W 36/18* (2013.01); *H04W 24/08* (2013.01); *H04W 36/0061* (2013.01);
(Continued)

(58) Field of Classification Search
CPC . H04W 24/08; H04W 36/0061; H04W 36/08; H04W 36/18; H04W 36/30;
(Continued)

(56) References Cited

U.S. PATENT DOCUMENTS

2004/0017795 A1* 1/2004 Abraham ............... H04W 36/26
370/348
2005/0053035 A1* 3/2005 Kwak ............... H04W 72/1268
370/331
(Continued)

FOREIGN PATENT DOCUMENTS

EP 1583270 A1 10/2005
WO 98/48530 A2 10/1998
(Continued)

OTHER PUBLICATIONS

"Universal Mobile Telecommunications Systems (UMTS); Iub/Iurcongestion control(3 GPP TR 25.902 version 6.0.0 Release 6)" 20050901, Sep. 1, 2005 (Sep. 1, 2005), pp. 1-16, XP014031777.
(Continued)

Primary Examiner — Nathan Taylor
(74) Attorney, Agent, or Firm — Sughrue Mion, PLLC

(57) ABSTRACT

A method for a mobile communication system, the mobile communication system defining a dedicated channel (DCH) active set and an enhanced-dedicated channel (E-DCH) active set, the method including performing a power measurement of a pilot signal from a cell that is not included in the E-DCH active set but included in the DCH active set, and performing a power measurement of a pilot signal from a cell that is included in the E-DCH active set.

16 Claims, 4 Drawing Sheets

INTRAFREQUENCY MEASUREMENTS

- Event 1a. $10 \cdot \log_{10}(M_{new}) \geq W \cdot 10 \cdot \log_{10}\left(\sum_{i=1}^{N_A} M_i\right) + (1-W) \cdot M_{Best} - (R_{1a} - H_{1a}/2)$

- Event 1b. $10 \cdot \log_{10}(M_{Old}) \leq W \cdot 10 \cdot \log_{10}\left(\sum_{i=1}^{N_A} M_i\right) + (1-W) \cdot M_{Best} - (R_{1b} - H_{1b}/2)$ $M_{new}$ the measurement result of the cell entering the reporting range.
$M_i$ a measurement result of a cell in the active set.
$N_A$ the number of cells in the current active set.
$M_{Best}$ the measurement result of the strongest cell in the active set.
$W$ a weighting parameter sent from RNC to UE.
$R_{1a}$ the reporting range for Event 1a sent from RNC to UE.
$H_{1a}$ the hysteresis parameter for Event 1a.
$R_{1b}$ the reporting range constant for Event 1b sent from RNC.
$M_{Old}$ the measurement result of the cell leaving the reporting range.
$H_{1b}$ the hysteresis parameter for Event 1b.

Related U.S. Application Data continuation of application No. 14/059,169, filed on Oct. 21, 2013, now Pat. No. 9,179,345, which is a continuation of application No. 11/662,490, filed as application No. PCT/JP2006/322207 on Oct. 31, 2006, now Pat. No. 8,577,382.

(51) Int. Cl.
| | |
|---|---|
| *H04W 36/18* | (2009.01) |
| *H04W 36/08* | (2009.01) |
| *H04W 36/32* | (2009.01) |
| *H04W 36/36* | (2009.01) |
| *H04W 24/08* | (2009.01) |
| *H04W 88/12* | (2009.01) |

(52) U.S. Cl.
CPC ........... *H04W 36/08* (2013.01); *H04W 36/30* (2013.01); *H04W 36/32* (2013.01); *H04W 36/36* (2013.01); *H04W 88/12* (2013.01)

(58) Field of Classification Search
CPC ..... H04W 36/32; H04W 36/36; H04W 88/12; H04W 36/00; H04W 4/00; H04W 72/00
USPC .................. 455/434, 437, 444, 449; 370/331
See application file for complete search history.

(56) References Cited

U.S. PATENT DOCUMENTS

| | | | | |
|---|---|---|---|---|
| 2006/0039326 | A1* | 2/2006 | Jeong | H04W 72/042 370/329 |
| 2006/0128312 | A1* | 6/2006 | Declerck | H04B 17/318 455/67.11 |
| 2007/0127369 | A1* | 6/2007 | Sebire | H04L 12/5693 370/229 |
| 2007/0189282 | A1* | 8/2007 | Lohr | H04B 7/022 370/370 |
| 2007/0191013 | A1* | 8/2007 | Gunnarsson | H04W 36/04 455/438 |

FOREIGN PATENT DOCUMENTS

| | | |
|---|---|---|
| WO | 2004/014097 A1 | 2/2004 |
| WO | 2005/018255 A1 | 2/2005 |

OTHER PUBLICATIONS

3GPP TS25.33I, V 6.7.0, (online), 3rd Generation Partnership Project, Sep. 2005, p. 191-192, 1051-1054, 1069-1070, Internet URL: http://www.3gpp.org/ftp/Specs/2005-09/Rel6/25_series/25331-670.zip.
3rd Generation Partnership Project (3GPP TS 25.309) V6.4.0 (Sep. 2005) FDD Enhanced Uplink; Overall Description; Stage 2 (Release 6), 3GPP Organizational Partners, Sep. 30, 2005, pp. 1-34.
Chinese Office Action dated Jul. 31,2009 in Appl. No. 200680001211.0 (with English translation).
Communication dated Jun. 11, 2015 from the European Patent Office in counterpart European Application No. 15157056.1.
Communication dated Sep. 8, 2015 from the United States Patent and Trademark Office in counterpart U.S. Appl. No. 14/801,886.
Final Office Action dated Mar. 12, 2013 in U.S. Appl. No. 11/662,490.
Final Office Action dated May 27, 2010 in U.S. Appl. No. 11/662,490.
International Search Report dated Apr. 13, 2007 in PCT/JP2006/322207.
Japanese Office Action dated Dec. 24, 2009 with partial English-language translation.
Korean Office Action dated Jun. 23, 2008 with an English language translation.
Mitsubishi Electric, "The relation between E-DCH Maximum Active Set size and DCH Maximum Active Set size", GPP TSG RAN WG2 #47 Meeting, R2-051287,[online], 3rd Generation Partnership Project, May 13, 2005, Internet URL: http://www.3gpp.org/ftp/tsg_ranAA/G2_RL2/TSGR247/Documents/R2-05128.ZIP>.
Motorola, "Maximum Size of Active Set for HSUPA", 3GPP TSG-RAN2 Meeting #46, R2-050528, Feb. 2005.
Non-Final Office Action dated May 22, 2010 in U.S. Appl. No. 11/662,490.
Non-Final Office Action dated Sep. 18, 2009 in U.S. Appl. No. 11/662,490.
Notice of Allowance dated Jul. 3, 2013 in U.S. Appl. No. 11/662,490.

* cited by examiner

INTRAFREQUENCY MEASUREMENTS

- Event 1a. $10 \cdot \log_{10}(M_{new}) \geq W \cdot 10 \cdot \log_{10}\left(\sum_{i=1}^{N_A} M_i\right) + (1-W) \cdot M_{Best} - (R_{1a} - H_{1a}/2)$

- Event 1b. $10 \cdot \log_{10}(M_{Old}) \leq W \cdot 10 \cdot \log_{10}\left(\sum_{i=1}^{N_A} M_i\right) + (1-W) \cdot M_{Best} - (R_{1b} - H_{1b}/2)$ $M_{new}$    the measurement result of the cell entering the reporting range.

$M_i$    a measurement result of a cell in the active set.

$N_A$    the number of cells in the current active set.

$M_{Best}$    the measurement result of the strongest cell in the active set.

$W$    a weighting parameter sent from RNC to UE.

$R_{1a}$    the reporting range for Event 1a sent from RNC to UE.

$H_{1a}$    the hysteresis parameter for Event 1a.

$R_{1b}$    the reporting range constant for Event 1b sent from RNC.

$M_{Old}$    the measurement result of the cell leaving the reporting range.

$H_{1b}$    the hysteresis parameter for Event 1b.

FIG. 1

UMTS SYSTEM

ENHANCED DEDICATED-CHANNEL REPORTING FOR UMTS

CROSS-REFERENCE TO RELATED APPLICATIONS

The present application is a Continuation Application of U.S. application Ser. No. 14/801,886, filed Jul. 17, 2015, which is a Continuation Application of U.S. application Ser. No. 14/059,169, filed Oct. 21, 2013, now U.S. Pat. No. 9,179,345, which is a Continuation Application of U.S. patent application Ser. No. 11/662,490, filed on Mar. 15, 2007, now U.S. Pat. No. 8,557,382, which is based on and claims priority from Patent Cooperation Treaty Application PCT/JP2006/322207 filed on Oct. 31, 2006, which is based on and claims priority from United Kingdom Patent Application No. 0522185.8, filed on Oct. 31, 2005, the entire contents of which are incorporated herein by reference.

TECHNICAL FIELD

The subject invention relates to UMTS (Universal Mobile Telecommunications System) communication and, more particularly, to UMTS communication that uses not only a superset of dedicated radio links but also simultaneously uses a subset of enhanced dedicated radio links.

This application is based upon and claims the benefit of priority from UK patent application No.0522185.8, filed on Oct. 31, 2005, the disclosure of which is incorporated herein in its entirety by reference.

BACKGROUND ART

Cellular telephone communications have greatly advanced since the first system became operational in Japan in 1979 These first-generation systems were analogue. By the end of the 1980's the technology had moved to second-generation digital systems for two reasons. Firstly, analogue systems in use became incompatible with each other, and secondly, it was more economic to operate digital systems. In the early 1990's various second-generation systems were introduced. In Europe, GSM (Global System for Mobile Communications) was introduced. The United States introduced a second-generation system (AMPS) different from GSM, although it subsequently introduced a modified GSM.

GSM represents an interface between cellular phones (User Equipment: UEs) and a Core Network (CN). The interface includes a series of Radio Network Controllers (RNCs), with each RNC connected to a series of Base Stations (BSs), each of which in turn transmits and receives to UEs within its broadcast range. At any one time a UE sends and receives signals to one of the RNCs through only one of the BSs. As a UE moves around under GSM a "hard handover" takes place between one base station and another. The UE is constantly monitoring the power level of respective pilot channel signals received from the current BS and in-range BSs, and is sending resulting power comparison data in signals through the present BS to the RNC controlling the current BS. When the RNC determines that a signal from one of the in-range BSs is being received by the UE at a power level greater by at least a threshold amount over the power level of the current BS, the RNC directs the UE to start communicating with that one of the in-range BSs and to cease communicating with the current BS. The handover is called a "hard handover" because the UE ceases transmitting to the one BS for a very short interval before it starts transmitting to the new BS; there is no "soft" transition involving communication with both BSs simultaneously.

With the tremendous growth in cellular phone services and the increased demand to use them for "roaming", the need for a universal standard became recognized. Technology was at the same time improving, so this "third-generation" system could incorporate improved technology, and integrate telecommunications features with those of Internet Protocol (IP) networks. UMTS primarily only differs from GSM in the communication between the RNC level and the UE level; the CN remains essentially the same as with GSM. Instead of communication of a UE through a single BS at any one time, UMTS uses UTRAN (Universal Terrestrial Radio Access Network) consisting of a network in which RNCs communicate with a series of nodes (nodeBs) simultaneously. Each nodeB supports one or more "cells" each of which has a signal coverage area, and the UE communicates with the cell or cells from a series of nodeBs.

Instead of handover of a UE from one BS to another BS as in GSM, mobility of the UE causes a continuing change in those nodeBs by which the UE communicates with the RNC, e.g. some are dropped as others are picked up. A "UMTS UE" is capable of receiving and transmitting through a communication path that involves simultaneous operation of all of the cells through which the UE passes, the UE and the RNC being at respective opposite ends of a communication path that uses the cells. UMTS results not only in a unified universal standard for UE manufacturers, but its signal transmission and reception diversity results also in improved signal quality. GSM is meanwhile still also in use, with UMTS and GSM existing side-by-side in many locations to allow persons with either type of UE to effectively use their mobile phones. In the CN, UMTS and GSM communications are similar; as indicated earlier, the two systems differ mainly in how communication proceeds between the RNCs and the UEs.

In comparison to the "hard handover" used in GSM, UMTS uses "soft handover". There also exists what is termed "softer handover", but for purposes of this invention it is sufficient to only describe "soft handover". As mentioned above, a UMTS UE operates with a continuously-updated set of cells through which it is receiving and transmitting to its RNC. The criteria for cells entering and leaving what is termed the "Active Set" of cells is known. A general description is provided, for instance, in "Radio Network Planning and Optimisation for UMTS" by Laiho, Wacker and Novosad. Cell addition, removal or replacement are three of the six categories of "Events" recognized under UMTS. Addition of a cell is termed "an Event 1a", removal of a cell is termed "an Event 1b", and replacement of a cell with another cell is termed "an Event 1c". The addition, removal or replacement of cells is each dependent on differential power-level measurements between pilot signals of respective cells. Such measurements are taken periodically by the UE and transmitted to its RNC for appraisal. If the RNC deter-mines that the criteria is satisfied for adding, removing or replacing one of the cells through which the UE is communicating, the RNC sends a signal to the UE to take necessary actions to either start or terminate communication with a cell, or to both start communication with one cell while terminating communication with another. FIG. 1 shows the equations involved in determining the Events 1a and 1b, and indicates the factors involved in that determination.

DISCLOSURE OF THE INVENTION

The set of cells mentioned above will henceforth be termed the "superset of cells" or "superset cells" for the particular UE. The subject invention relates to communication of a UE not only with its superset cells but also with a second set of cells which will be termed the "subset of cells" or "subset cells". As is illustrated in FIG. 2, all subset cells are also superset cells but not all superset cells are subset cells. As with superset cells which are being continuously exchanged (indicated by I) with non-superset cells of the UMTS network as the UE roams, superset cells may also join and leave the subset.

A conventional UMTS UE may simply require a software upgrade so as to be able to differentiate between superset cells and subset cells. Similarly, a RNC may only require a minor software upgrade. Examples of the enhanced capabilities provided by subset cells over those of superset cells are: (i) higher data rates for data transmission, and (ii) closer transmission and reception intervals. A subset cell is able to transmit and receive at the higher data rates and the closer transmission intervals as well as at the "normal" data rates and transmission intervals of the superset cells. However, superset cells are not able to communicate with the UE at the higher data rates or closer transmission intervals of the subset cells. A subset-capable cell is a superset cell which is capable of higher data rates and closer transmission intervals, i.e. enhanced communication, but is communicating with the UE at the "normal" data rates and transmission intervals of the superset cells. The subject invention is involved with the transition of some superset cells to be subset cells and with their transition back to superset cells. It should be noted that the current superset and subset cells are also referred to, respectively, as the DCH (Dedicated Channel) Active Set (DAS) and the E-DCH (Enhanced Dedicated Channel) Active Set of cells (EAS).

A problem has existed that downlink Event-triggered measurement reports can only be configured (measured by the UE) on a superset-cell basis and not also on a subset-cell basis.

Thus a problem is not in determining membership of the superset, but rather in determining which of the superset cells are also subset cells. For the purpose of power measurements, conventional UEs only recognize the difference between in-range cells and superset cells; they cannot recognize the difference between those superset cells that are not also subset cells, i.e. subset-capable cells, and those superset cells that are also subset cells. The RNC knows the difference, but the difference is not communicated to the UE. One embodiment may alleviate this problem, since a UE that has knowledge of (i) which cells are superset cells only, (ii) which cells are superset cells that are subset-capable cells, and (iii) which cells are subset cells (in addition to being superset cells) can use that information in taking power measurements that can be used to determine when subset cells should be added, removed or exchanged with other subset. cells. A related problem involves the situation where an in-range cell becomes a superset cell and where it is eligible to also become a subset cell.

In one form of a first aspect, the subject invention provides a method for Universal Mobile Telecommunications System (UMTS) communication utilizing User Equipment (UE) and a Radio Network Controller (RNC) for communicating with the UE through a changing set of cells. The method includes periodically performing the steps of: measuring at the UE the power in received pilot signals from in-range cells; deter-mining which of in-range cells are to be included in communication to the UE (superset cells), an in-range cell being determined to be a superset cell if the UE-received pilot-signal power is above a superset power threshold; determining whether any of the superset cells is also a subset cell capable of providing enhanced UE communication, a superset cell being determined to be also a subset cell if : that superset cell is known to have the capability of also being a subset cell; and, the number of existing subset cells is below a predetermined maximum number of subset cells.

The method may include the step of using the determined result for determining what to include in the next power measurement at the UE.

In another form, the subject invention provides a method performed by a Radio Network Controller (RNC) of a Universal Mobile Telecommunications System (UMTS). The method includes periodically performing the steps of: receiving from User Equipment (UE) measurement of power in pilot signals of cells; determining which of in-range cells are to be included in communication to the UE (superset cells), an in-range cell being determined to be a superset cell if the UE-received pilot-signal power is above a superset power threshold; determining whether any of the superset cells is also a subset cell capable of providing enhanced UE communication, a superset cell being determined to be also a subset cell if: that superset cell is known to have the capability of also being a subset cell; and, the number of existing subset cells is below a predetermined maximum number of subset cells.

The method may further include the step of transmitting the determined result to the UE. The determined result may include information on each cell as to whether the category of the cell is in-range cell, superset cell, subset-capable cell or subset cell, that information being used by the UE for determining what to include in the next power measurement.

In a further form, the subject invention provides a method performed by User Equipment (UE) of a Universal Mobile Telecommunications System (UMTS). The method includes periodically performing the steps of: measuring power in cell pilot signals, the measurements allowing for: determining which of in-range cells are to be included in communication to the UE (superset cells), an in-range cell being determined to be a superset cell if the UE-received pilot-signal power is above a superset power threshold; and, determining whether any of the superset cells is also a subset cell capable of providing enhanced UE communication, a superset cell being determined to be also a subset cell if: that superset cell is known to have the capability of also being a subset cell; and, the number of existing subset cells is below a predetermined maximum number of subset cells; and, following the determining steps, storing information on each cell as to whether the category of the cell is in-range cell, superset cell, subset-capable cell or subset cell, that information being used for determining what to include in the next power measurement.

Preferably, a superset cell is only determined to be also a subset cell if, additionally, the UE-received pilot-signal power of that superset cell is above a subset power threshold different from the superset power threshold.

In one form of another aspect, the subject invention provides a method for Universal Mobile Telecommunications System (UMTS) communication utilizing User Equipment (UE) and a Radio Network Controller (RNC) for communicating with the UE through a changing set of cells. The method includes periodically performing the steps of: measuring at the UE the power in received pilot signals from in-range cells; deter-mining which of in-range cells are to be included in communication to the UE (superset cells), an in-range cell being determined to be a superset cell if the UE-received pilot-signal power is above a superset power threshold; determining whether any of the superset cells is also a subset cell capable of providing enhanced UE communication, a superset cell being determined to be also a subset cell if : that superset cell is known to have the capability of also being a subset cell; and, the UE-received pilot-signal power of that superset cell is above a subset power threshold different from the superset power threshold.

The method may include the further step of using the determined result for determining what to include in the next power measurement at the UE.

In another form, the subject invention provides a method performed by a Radio Network Controller of a Universal Mobile Telecommunications System (UMTS). The method includes periodically performing the steps of: receiving from User Equipment (UE) measurement of power in pilot signals of cells; determining which of in-range cells are to be included in communication to the UE (superset cells), an in-range cell being determined to be a superset cell if the UE-received pilot-signal power is above a superset power threshold; determining whether any of the superset cells is also a subset cell capable of providing enhanced UE communication, a superset cell being determined to be also a subset cell if: that superset cell is known to have the capability of also being a subset cell; and, the UE-received pilot-signal power of that superset cell is above a subset power threshold different from the superset power threshold.

The method may further include the step of transmitting the determined result to the UE. The determined result may include information on each cell as to whether the category of the cell is in-range cell, superset cell, subset-capable cell or subset cell, that information being used by the UE for determining what to include in the next power measurement.

In a further form, the subject invention provides a method performed by User Equipment (UE) of a Universal Mobile Telecommunications System (UMTS). The method includes periodically performing the steps of: measuring power in pilot signals of cells, the measurement allowing for: determining which of in-range cells are to be included in communication to the UE (superset cells), an in-range cell being determined to be a superset cell if the UE-received pilot-signal power is above a superset power threshold; and, determining whether any of the superset cells is also a subset cell capable of providing enhanced UE communication, a superset cell being determined to be also a subset cell if: that superset cell is known to have the capability of also being a subset cell; and, the UE-received pilot-signal power of that superset cell is above a subset power threshold different from the superset power threshold; and, following the determining steps, storing information on each cell as to whether the category of the cell is in-range cell, superset cell, subset-capable cell or subset cell, that information being used in the next power measuring.

Preferably, a superset cell is only determined to be also a subset cell if, additionally, the number of existing subset cells is below a predetermined maximum number of subset cells.

The predetermined maximum number of subset cells may be one, two or three less than the number of superset cells.

The superset power threshold may be a lower value of a superset defined range of power having as an upper value the pilot-signal power of the in-range cell that is measured to have the highest received power from among the in-range cells.

The subset power threshold may be a lower value of a subset defined range of power having as an upper value the pilot-signal power of the in-range cell that is measured to have the highest received power from among the in-range cells. Alternatively, the subset power threshold may be determined as follows. For the superset cell determined firstly to be also a subset cell (first subset cell), the subset power threshold is one of: (1) the power level of a subset-capable cell having the highest power level in the superset, and (ii) a predetermined power value; and, for the superset cells subsequently determined to be also subset cells, the subset power threshold is a lower value of a second defined range of power having as an upper value the pilot-signal power of the subset cell that is measured to have the highest received power.

The method may also include the steps of: communicating between the UE and the RNC by using the superset cells; and, if any of the superset cells is determined to be also a subset cell, adding enhanced UE communication to existing UE communication on that cell.

The method may also include the steps of: communicating between the UE and the RNC by using the superset cells; and, if at least one of the superset cells is determined to be also a subset cell, changing the communication such that: a maximum of four cells are used in the UE communication; and, those of the cells that are subset cells utilize the enhanced UE communication.

The superset cells may include: six or less cells if none of the superset cells is also a subset cell; and, four or less cells if at least one of the superset cells is also a subset cell.

In the method, the RNC may have knowledge of which of the superset cells has the capability of also being a subset cell, and the RNC then performs the determining steps based on that knowledge and based on the pilot-signal power measurements which are made at the UE and forwarded to the RNC by the UE.

The enhanced UE communication may be UE communication at higher data rates and/or higher transmission intervals.

The higher data rates may be in the range of 200 to 1200 kilobits/second.

The enhanced UE communication may involve only uplink communication from the UE.

The superset defined range of power may be 4 dB. The subset defined range of power may be 2 dB.

The method may include the further step of: placing the superset cells in order of power level, extending from the superset cell with the highest measured pilot-signal power level in the superset defined range of power to the superset cell with the lowest measured pilot-signal power level in that range.

The method may include the further step of: placing the subset cells in order of power level, extending from the subset cell with the highest measured pilot-signal power level in the subset defined range of power to the subset cell with the lowest measured pilot-signal power level in that range.

In any of the preceding methods, power and power level are measured in terms of: Signal-to-Noise Ratio (SNR); Path Loss; or, Signal Strength.

In one form of a still further aspect, the subject invention provides a Universal Mobile Telecommunications System (UMTS) system that includes: User Equipment (UE) including means for measuring the power in received pilot signals from in-range cells; a Radio Network Controller (RNC) that includes: means for receiving information on the power measurements from the UE; means for determining which of in-range cells are to be included in communication to the UE (superset cells), an in-range cell being determined to be a superset cell if the UE-received pilot-signal power is above a superset power threshold, and for determining whether any of the superset cells is also a subset cell capable of providing enhanced UE communication, a superset cell being determined to be also a subset cell if: that superset cell is known to have the capability of also being a subset cell; and, the number of existing subset cells is below a predetermined maximum number of subset cells.

The UMTS system may further include means for transmitting the determined result to the UE, and may further include means for using the determined result for determining what to include in the next power measurement.

In another form, the subject invention provides a Radio Network Controller (RNC) of a Universal Mobile Telecommunications System (UMTS), the RNC including: means for receiving from User Equipment (UE) measurement of power in pilot signals of cells; and, means for determining: which of in-range cells are to be included in communication to the UE (superset cells), an in-range cell being determined to be a superset cell if the UE-received pilot-signal power is above a superset power threshold, and determining whether any of the superset cells is also a subset cell capable of providing enhanced UE communication, a superset cell being determined to be also a subset cell if: that superset cell is known to have the capability of also being a subset cell; and, the number of existing subset cells is below a predetermined maximum number of subset cells.

The RNC may further include means for transmitting the determined result to the UE. The determined result may include information on each cell as to whether the category of the cell is in-range cell, superset cell, subset-capable cell or subset cell, that information being used in the following measurement of power by the UE.

In a further form, the subject invention provides User Equipment (UE) of a Universal Mobile Telecommunications System (UMTS), the UE including: means for measuring power in cell pilot signals, the measurement allowing for: determining which of in-range cells are to be included in communication to the UE (superset cells), an in-range cell being determined to be a superset cell if the UE-received pilot-signal power is above a superset power threshold, and determining whether any of the superset cells is also a subset cell capable of providing enhanced UE communication, a superset cell being determined to be also a subset cell if: that superset cell is known to have the capability of also being a subset cell; and, the number of existing subset cells is below a predetermined maximum number of subset cells; and, means for, following the determining steps, storing information on each cell as to whether the category of the cell is in-range cell, superset cell, subset-capable cell or subset cell, that information being used in the following power measurement.

Preferably, a superset cell is only determined to be also a subset cell if, additionally, the UE-received pilot-signal power of that superset cell is above a subset power threshold different from the superset power threshold.

In one form of a yet further aspect, the subject invention provides a Universal Mobile Telecommunications System (UMTS) that includes: User Equipment (UE) including means for measuring the power in received pilot signals from in-range cells; a Radio Network Controller (RNC) including: means for receiving information on the power measurements from the UE; means for determining which of in-range cells are to be included in communication to the UE (superset cells), an in-range cell being determined to be a superset cell if the UE-received pilot-signal power is above a superset power threshold, and for determining whether any of the superset cells is also a subset cell capable of providing enhanced UE communication, a superset cell being determined to be also a subset cell if: that superset cell is known to have the capability of also being a subset cell; and, the UE-received pilot-signal power of that superset cell is above a subset power threshold different from the superset power threshold.

The UMTS system may further include means for transmitting the determined result to the UE, and may still further include means for using the determined result for determining what to include in the next power measurement.

In another form, the subject invention provides a Radio Network Controller (RNC) of a Universal Mobile Telecommunications System (UMTS), the RNC including: means for receiving from User Equipment (UE) measurement of power in pilot signals of cells; means for: determining which of in-range cells are to be included in communication to the UE (superset cells), an in-range cell being determined to be a superset cell if the UE-received pilot-signal power is above a superset power threshold, and determining whether any of the superset cells is also a subset cell capable of providing enhanced UE communication, a superset cell being determined to be also a subset cell if: that superset cell is known to have the capability of also being a subset cell; and, the UE-received pilot-signal power of that superset cell is above a subset power threshold different from the superset power threshold.

The RNC may further include means for transmitting the determined result to the UE. The determined result may include information on each cell as to whether the category of the cell is in-range cell, superset cell, subset-capable cell or subset cell, that information being used in the following measurement of power by the UE.

In a further form, the subject invention provides User Equipment (UE) of a Universal Mobile Telecommunications System (UMTS), the UE including: means for measuring power in pilot signals of cells, the measurement allowing for: deter-mining which of in-range cells are to be included in communication to the UE (superset cells), an in-range cell being determined to be a superset cell if the UE-received pilot-signal power is above a superset power threshold, and determining whether any of the superset cells is also a subset cell capable of providing enhanced UE communication, a superset cell being determined to be also a subset cell if: that superset cell is known to have the capability of also being a subset cell; and, the UE-received pilot-signal power of that superset cell is above a subset power threshold different from the superset power threshold; and, means for, following the determining steps, storing information on each cell as to whether the category of the cell is in-range cell, superset cell, subset-capable cell or subset cell, that information being used in the following power measurement.

Preferably, in the UMTS system, RNC or UE, a superset cell is only determined to be also a subset cell if, additionally, the number of existing subset cells is below a predetermined maximum number of subset cells.

Preferably, in the UMTS system, RNC, or UE, the predetermined maximum number of subset cells is one, two or three less than the number of superset cells.

Preferably, in the UMTS system, RNC or UE, the superset power threshold is a lower value of a superset defined range of power having as an upper value the pilot-signal power of the in-range cell that is measured to have the highest received power from among the in-range cells. And more preferably, the subset power threshold is a lower value of a subset defined range of power having as an upper value the pilot-signal power of the in-range cell that is measured to have the highest received power from among the in-range cells. Alternatively, more preferably: for the superset cell first determined to be also a subset cell (first subset cell), the subset power threshold is one of: (i) the power level of a subset-capable cell having the highest power level in the superset, and (ii) a predetermined power value; and, for the superset cells subsequently determined to be also subset cells, the subset power threshold is a lower value of a second defined range of power having as an upper value the pilot-signal power of the subset cell that is measured to have the highest received power.

The UMTS system, RNC or UE may further include: means for communicating between the UE and the RNC by using the superset cells; and, means for, if any of the superset cells is determined to be also a subset cell, adding enhanced UE communication to existing UE communication on that cell.

The UMTS system, RNC or UE may further include: means for communicating between the UE and the RNC by using the superset cells; and, means for, if at least one of the superset cells is determined to be also a subset cell, changing the communication such that: a maximum of four cells are used in the UE communication; and, those of the cells that are subset cells utilize the enhanced UE communication.

In the UMTS system, RNC or UE, the superset cells may include: six or less cells if none of the superset cells is also a subset cell; and, four or less cells if at least one of the superset cells is also a subset cell.

In the UMTS system, RNC or UE, the RNC may have knowledge of which of the superset cells has the capability of also being a subset cell, with the RNC performing the determining steps based on that knowledge and based on pilot-signal power measurements which are made at the UE and forwarded to the RNC by the UE.

In the UMTS system, RNC or UE, the enhanced UE communication may be UE communication at higher data rates and/or higher transmission intervals. Those higher data rates may be in the range of 200 to 1200 kilobits/second. The enhanced UE communication may be uplink communication from the UE. The superset defined range of power may be 4 dB. The subset defined range of power may be 2 dB.

The UMTS system, RNC or UE may further include: means for placing the superset cells in order of power level, extending from the superset cell with the highest measured pilot-signal power level in the superset defined range of power to the
superset cell with the lowest measured pilot-signal power level in that range.

The UMTS system, RNC or UE may further include: means for placing the subset cells in order of power level, extending from the subset cell with the highest measured pilot-signal power level in the subset defined range of power to the subset cell with the lowest measured pilot-signal power level in that range.

In the UMTS system, RNC or UE, power and power level may be measured in terms of: Signal-to-Noise Ratio (SNR); Path Loss; or, Signal Strength.

BRIEF DESCRIPTION OF DRAWING

Preferred features of the present invention will now be described, by way of example only, with reference to the accompanying drawings, in which:

FIG. 1 shows the equations involved in determining the Events 1a and 1b, and indicates the factors involved in that determination;

BEST MODE FOR CARRYING OUT THE INVENTION

Although a UE is able to communicate with its RNC through a maximum of six cells when none of the cells is an E-DCH cell, i.e. all are DCH, that maximum number of cells drops to four cells if one of the DCH cells becomes also an E-DCH cell. Whether a cell can transition from being a DCH cell to an E-DCH cell is dependent upon several factors. Firstly, the DCH cell has to be associated with a nodeB that has been upgraded to pass enhanced communication to the RNC. The RNC keeps a record of all the nodeBs under its control that have the E-DCH capability.

Secondly, the first form of subject invention requires that the number of E-DCH cells already in use at the UE be below a predetermined maximum number. Based on measurements that are forwarded to the RNC by the UE on the second factor, the RNC determines whether a DCH cell of a UE can become an E-DCH cell. It should be noted that in UMTS each UE typically sends an updated set of power measurements to its RNC when a particular event is triggered.

First Embodiment

Figure 2:
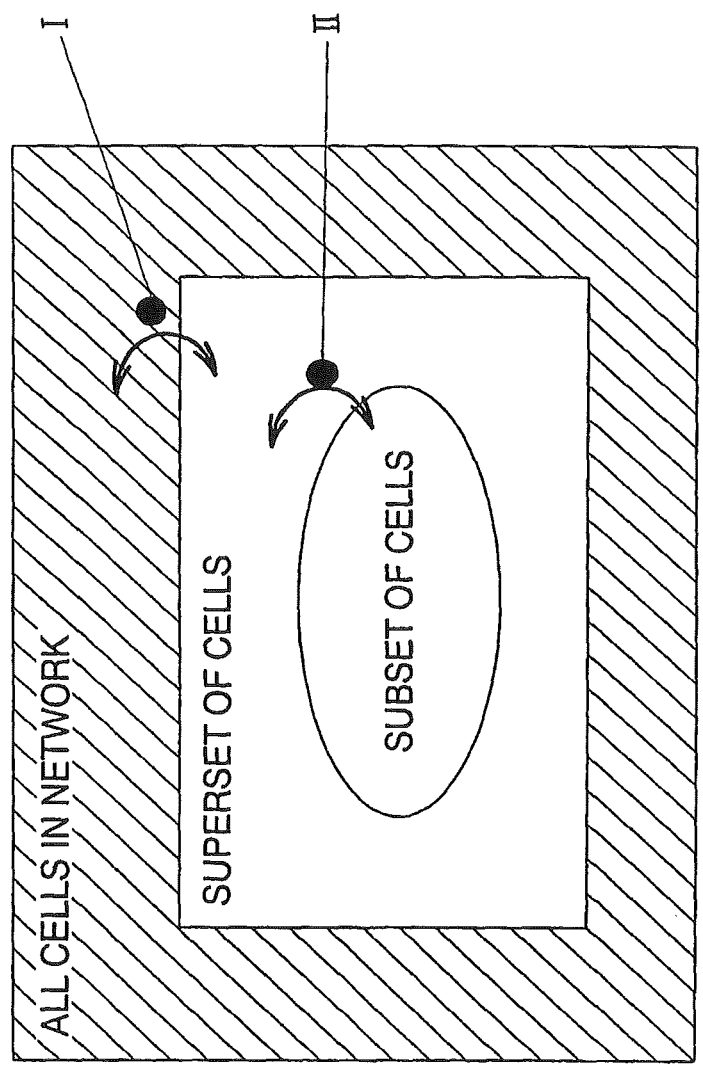
FIG. 2 shows the relationship between in-range cells, superset cells and subset cells.
Figure 3:
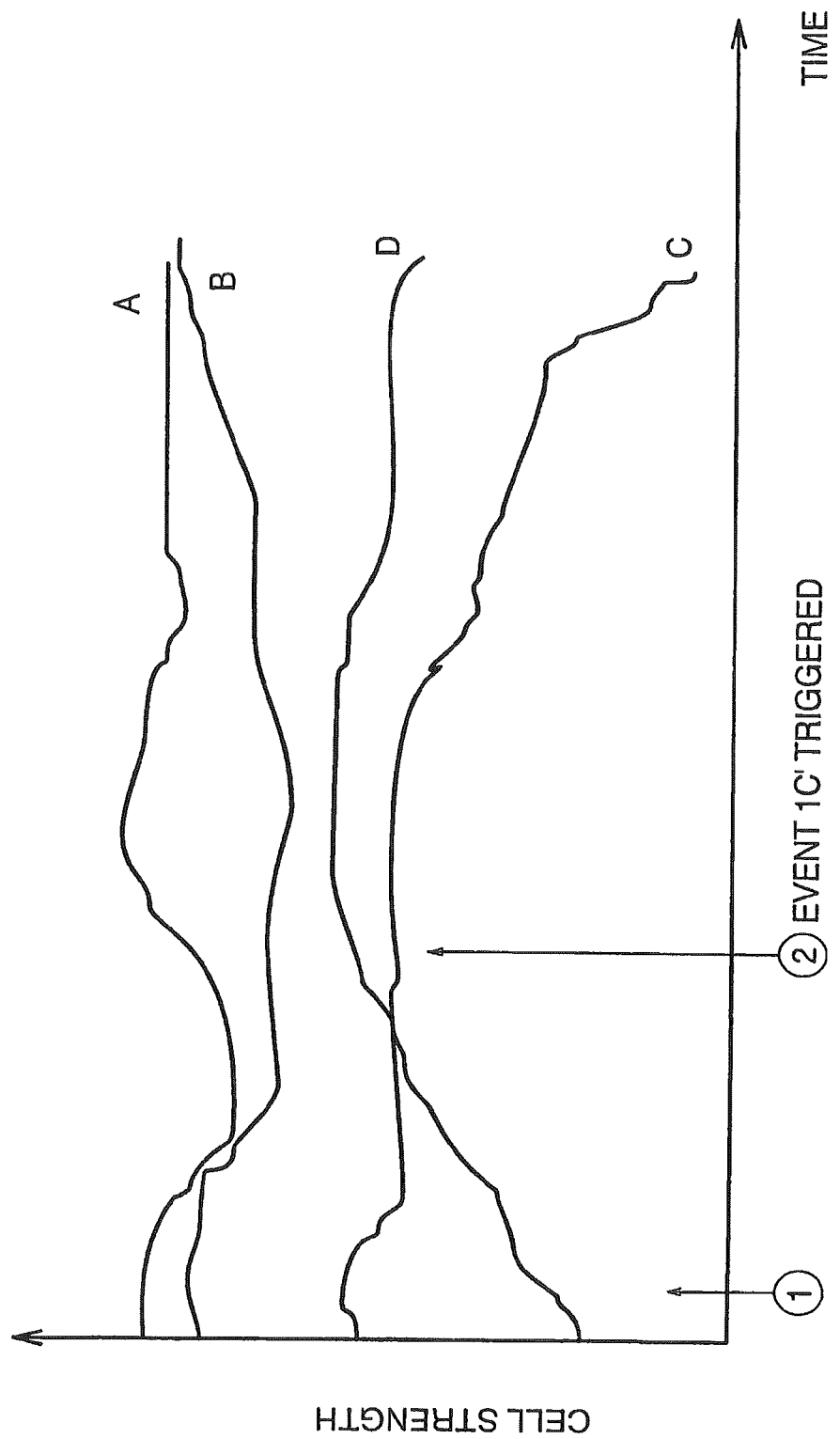
FIG. 3 is a graph of cell strength with time, the graph illustrating a triggering of an Event 1c'.
Figure 4:
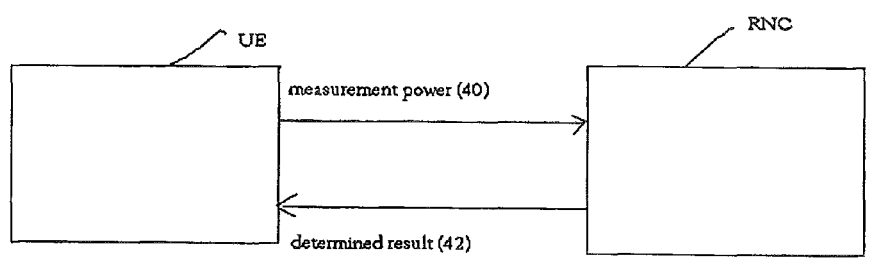
FIG. 4 illustrates a UMTS system including the UE and RNC of the disclosure.

FIG. 3 relates to an example of a first embodiment of the subject invention. The first aspect relates to a situation in which a UE is passing through a mix of E-DCH and non-E-DCH cells or through E-DCH cells only, and where the maximum Active Set size for DCH is larger than E-DCH. The example here involves a maximum Active Set size for DCH of 4 (4 instead of 6 applying here, since at least one E-DCH cell already exists); it also involves a predetermined maximum Active Set size for E-DCH of the maximum Active Set size for E-DCH could be set to 2 or even to 1 In the first embodiment, E-DCH cells are added until the predetermined maximum Active Set size is reached. Once the maximum number is reached, an Event 1c' (FIG. 3) is required to replace one of the E-DCH cells (usually the E-DCH cell with the lowest power) with another E-DCH cell. (Note that Event 1c represents an exchange of a superset cell with another cell not in the superset, whereas an Event 1c' represents an exchange of a subset cell with another cell not in the subset.) The sequence of Events, as shown in FIG. 3, are:

1 DCH (Active Set)=(A*, B*, C*, D*)
   E-DCH Active Set=(A, B, C)
2 DCH (Active Set) =(A*, B*, D*, C*)
   E-DCH Active Set=(A, B, D)

In this situation, the new Event 1c' is triggered to replace cell C in the E-DCH Active Set with cell D of the E-DCH Active Set.

In the above example and those that follow, * indicates possible membership of the subset and the sequence "A, B, C, D, E" indicates the ordering of the cells according to their respective strength, i.e. cell A is the strongest and cell E is the weakest.

A second example of the first embodiment involves a more complicated situation, in which any of the new Events 1a', 1b' and 1c' can occur (respectively, adding, removing and exchanging cells). Rules to add cells to the subset are independent of rules to add cells to the superset. A typical sequence of Events in this case is the following:

1 DCH (Active Set)=(A, C*, B, D*)
   E-DCH Active Set=(C)
   Comment: Cell D quality is not good enough to become a member of the E-DCH Active Set.
2 DCH (Active Set)=(A, C*, D*, E*)
   E-DCH Active Set=(C, D)
   Comment: Cell D quality has improved, triggering Event 1a' to add cell D to the E-DCH Active Set.
3 DCH (Active Set)=(C*, E*, D*, F*)
   E-DCH Active Set=(C, E, D)
   Comment: New Event 1a' has been triggered to add Cell E to the E-DCH Active Set.
4 DCH (Active Set)=(F*, C*, E*, D*)
   E-DCH Active Set=(F, C, E)
   Comment: New Event 1c' has been triggered to replace Cell D with Cell F in the E-DCH Active Set.
5 DCH (Active Set)=(F* C*, E*, D*)
   E-DCH Active Set=(F,C)
   Comment: New Event 1b' has been triggered to remove Cell E from the E-DCH Active Set.

The E-DCH Serving Cell, i.e. the E-DCH cell that is currently in use at any time is typically the one that is the E-DCH Active Set cell with the best quality. Such best cell can be determined by using an Event 1d measurement for the cells in the E-DCH Active Set.

The next example relates to a situation where the DCH Active Set of cells and the E-DCH Active set of cells, i.e. the superset and subset of cells, are interacting. In this case the UE is able to identify the superset cells with subset-call capability ("subset-capable cells") from the subset cells and to take power measurements of cells which the UE knows are within the subset as well as power measurements of cells that it knows are subset-capable (though not actually within the subset).

1 DCH (Active Set)=(C*, B)
   E-DCH Active Set=(C)
2 DCH (Active Set)=(C*, B, A)
   E-DCH Active Set=(C)
   Comment: Cell A is an in-range cell whose power has increased, and this triggers Event 1a to add Cell A to the DCH Active Set (but not to the E-DCH Active Set).
3 DCH (Active Set)=(C*, B, A, E*)
   E-DCH Active Set=(C)
   Comment: Cell E is an in-range cell whose power has increased, and this triggers Event 1a to add Cell E to the DCH Active Set (but not to the E-DCH Active Set).
4 DCH (Active Set)=(B, C*, E*, A)
   E-DCH Active Set=(C, E)
   Comment: Cell E power has increased, triggering an Event 1a' to add Cell E to the E-DCH Active Set.
5 DCH (Active Set)=(B, C*, A, E*)
   E-DCH Active Set=(C)
   Comment: Cell E power has decreased, triggering Event 1b' to remove Cell E from the E-DCH Active Set.
6 DCH (Active Set)=(B, C*, E*, A)
   E-DCH Active Set=(C, E)
   Comment: Cell E power has increased, triggering Event 1a' to add Cell E to the E-DCH Active Set.
7 DCH (Active Set)=(B, C*, E*, F*)
   E-DCH Active Set=(C, E)
   Comment: Cell A power has become less than Cell F, triggering Event 1c to replace Cell A with Cell F in the DCH Active Set (Cell F is not in the E-DCH Active Set).
8 DCH (Active Set)=(B, C*, E*, F*)
   E-DCH Active Set=(C, E, F)
   Comment: Cell F power has increased, triggering Event 1a' to add Cell F to the E-DCH Active Set.
9 DCH (Active Set)=(C*, F*, E*, D*)
   E-DCH Active Set=(C, F, E)
   Comment: Cell B power has decreased below that of Cell D, triggering Event 1c to replace Cell B with Cell D in the DCH Active Set.
10 DCH (Active Set)=(F*, D*, E*, C*)
   E-DCH Active Set=(F, D, E)
   Comment: Cell C power has become less than Cell D in the E-DCH Active Set, triggering Event 1c' to replace Cell C with Cell D in the E-DCH Active Set.
11 DCH (Active Set)=(F*, D*, E*, C*)
   E-DCH Active Set=(F, D)
   Comment: Cell E power has decreased, triggering Event 1b' to remove Cell E from the E-DCH Active Set.
12 DCH (Active Set)=(F*, D*, E*)
   E-DCH Active Set=(F, D)
   Comment: Cell C power has decreased, triggering Event 1b to remove Cell C from the DCH Active Set.

Second Embodiment

A second embodiment of the subject invention relates to the E-DCH Active Set of cells having a different power threshold from the power threshold of the DCH Active Set of cells. A UMTS might utilize the first embodiment in combination with the second embodiment to be described, or might use only one of them.

When the RNC determines that one of the superset cells meets the criteria for becoming a first subset cell, it conveys this information to the UE. The UE then recognizes that superset cell as also being a subset cell during the next power measurement. Conventional UEs did not recognize which of the superset cells were also subset cells, so there obviously existed no need for the UEs to consider whether a different power threshold should apply to subset cells than the power threshold applied to superset cells. However, with the UE of the subject invention able to distinguish between superset cells and subset cells, it is possible to consider the application of a different power threshold to each. This is a desirable feature for the following reason. The subnet cells operate at a faster data rate or a shorter interval between transmissions. Therefore, to maintain quality at the faster speed, it is important that the transmitted information in subset cells be transmitted with better quality if possible.

In turn, better quality requires that each subset cell be required to be within a small power band, i.e. a smaller power threshold.

What is proposed is that, if for instance the power threshold of the superset cells is set at 4 dB, the power threshold of the subset cells is set at say 2 dB. All cells in the E-DCH Active Set have to have a power level that is within 2 dB of each other, and this needs to be measured from the power of the subset cell that has the highest power value. That presents a problem, however, if the subset cell is the first subset cell. In that special case, the first subset call is selected if: (i) the power level of the candidate subset cell is the highest power level in the superset, or (ii) the power level of the candidate subset cell is above a predetermined power level separate from the cell power levels. If either criteria is met, the particular cell becomes the first subset cell, and the E-DCH Active Set is created with the particular cell as first member. If the UE is then advised that a second superset cell is capable of becoming a subset cell, the measurement next made is the power level of the particular cell now in the E-DCH Active Set. If the second potential subset cell has a power 2 dB or less below the power level of the particular cell, then the second cell joins the particular cell in the E-DCH Active Set. This continues until the maximum number allowed in the E-DCH Active Set is reached, after which Events 1c' are required to maintain the E-DCH Active Set at or below its maximum size. That maximum size could be the whole superset, although the first embodiment dealt with a situation in which the number of cells in the E-DCH Active Set (subset cells) is always maintained at one less than the number of cells in the DCH Active Set (superset cells).

It is of course possible that, although the subset is capable of having a different power threshold than the superset, it is desirable to maintain both at the same power threshold, i.e. 4 dB. This results in a simpler situation, but one still within the scope of the subject invention.

While the present invention has been described in its preferred embodiments, it is to be understood that the words which have been used are words of description rather than limitation, and that changes may be made to the invention without departing from its scope as defined by the claims.

Each feature disclosed in this specification (which term includes the claims) and/or shown in the drawings may be incorporated in the invention independently of other disclosed and/or illustrated features.

A Universal Mobile Telecommunications System (UMTS) allows User Equipment (UE) to distinguish between superset cells which are also subset cells and superset cells which are not. Subset cells in UMTS are cells associated with system nodes that allow enhanced communication such as, for instance, faster data rates or smaller intervals between transmissions.

The ability to distinguish between superset cells and subset cells allows UE to adjust its next set of power measurements of cells to capture power level changes among subset cells as well as among superset cells. Conventional UEs are only capable of knowing the difference between superset cells and cells that are in-range. The advantage of the UE knowing which superset cells are also subset cells or subset-capable cells is that the UE can provide extra information to help the RNC determine which cells to use for enhanced communication. Downlink communication to UEs is already at high speeds; the subject invention will provide a means for similar increases in uplink communication from UEs. A RNC and UE for operation in the UMTS are included in the invention.

The invention claimed is:

1. A mobile station in a mobile communications system, the mobile station comprising:
 a circuit configured to perform a first power measurement of a first pilot signal from a first cell that is not included in an enhanced-dedicated channel(E-DCH) active set but is included in a dedicated channel(DCH) active set;
 a circuit configured to perform a second power measurement of a second pilot signal from a second cell that is included in the E-DCH active set;
 a circuit configured to transmit, to a communications node, a first measurement result based on the first power measurement and a second measurement result based on the second power measurement; and
 a circuit configured to receive first information that indicates the first cell is to be added to the E-DCH active set.

2. The mobile station according to the claim 1, wherein the mobile station further comprises a circuit configured to receive second information that indicates the second cell is to be removed from the E-DCH active set.

3. A method performed by a mobile station in a mobile communications system, the method comprising:
 performing a first power measurement of a first pilot signal from a first cell that is not included in an enhanced-dedicated channel(E-DCH) active set but is included in a dedicated channel(DCH) active set;
 performing a second power measurement of a second pilot signal from a second cell that is included in the E-DCH active set;
 transmitting, to a communications node, a first measurement result based on the first power measurement and a second measurement result based on the second power measurement; and
 receiving first information that indicates the first cell is to be added to the E-DCH active set.

4. The method according to the claim 3, wherein the method further comprises receiving second information that indicates the second cell is to be removed from the E-DCH active set.

5. A communications node in a mobile communications system, the communications node comprising:
 a circuit configured to receive, from a mobile station, a first measurement result based on a first power measurement of a first pilot signal from a first cell that is not included in an enhanced-dedicated channel(E-DCH) active set but is included in a dedicated channel(DCH) active set;
 a circuit configured to receive, from the mobile station, a second measurement result based on a second pilot signal from a second cell that is included in the E-DCH active set;
 a circuit configured to transmit, to the mobile station, first information that indicates the first cell is to be added to the E-DCH active set.

6. The communications node according to the claim 5, wherein the communications node further comprises a circuit configured to transmit, to the mobile station, second information that indicates the second cell is to be removed from the E-DCH active set.

7. A method performed by a communications node in a mobile communications system, the method comprising:
 receiving, from a mobile station, a first measurement result of a first power measurement based on a first pilot signal from a first cell that is not included in an enhanced-dedicated channel(E-DCH) active set but is included in a dedicated channel(DCH) active set;
 receiving, from the mobile station, a second measurement result based on a second pilot signal from a second cell that is included in the E-DCH active set;
 transmitting, to the mobile station, first information that indicates the first cell is to be added to the E-DCH active set.

8. The method according to the claim 7, wherein the method further comprises transmitting, to the mobile station, second information that indicates the second cell is to be removed from the E-DCH active set.

9. The mobile station according to the claim 1, wherein the first information is determined based on the first measurement result and the second measurement result.

10. The mobile station according to the claim 2, wherein the second information is determined based on the first measurement result and the second measurement result.

11. The method according to the claim 3, wherein the first information is determined based on the first measurement result and the second measurement result.

12. The method according to the claim 4, wherein the second information is determined based on the first measurement result and the second measurement result.

13. The communications node according to the claim 5, wherein the communications node further comprises a circuit configured to determine the first information based on the first measurement result and the second measurement result.

14. The communications node according to the claim 6, wherein the communications node further comprises a circuit configured to determine the second information based on the first measurement result and the second measurement result.

15. The method according to the claim 7, wherein the method further comprises determining the first information based on the first measurement result and the second measurement result.

16. The method according to the claim 8, wherein the method further comprising determines the second information based on the first measurement result and the second measurement result.

* * * * *